United States Patent
Hansen et al.

(10) Patent No.: US 9,567,975 B2
(45) Date of Patent: Feb. 14, 2017

(54) METHOD FOR ADJUSTING THE ROTATIONAL SPEED OF A WIND TURBINE AND WIND TURBINE

(75) Inventors: Marco Hansen, Groven (DE); Karsten Warfen, Sohren (DE)

(73) Assignee: Senvion SE, Hamburg (DE)

( * ) Notice: Subject to any disclaimer, the term of this patent is extended or adjusted under 35 U.S.C. 154(b) by 852 days.

(21) Appl. No.: 13/822,027

(22) PCT Filed: Aug. 30, 2011

(86) PCT No.: PCT/EP2011/004350
§ 371 (c)(1),
(2), (4) Date: Mar. 11, 2013

(87) PCT Pub. No.: WO2012/041430
PCT Pub. Date: Apr. 5, 2012

(65) Prior Publication Data
US 2013/0177418 A1     Jul. 11, 2013

(30) Foreign Application Priority Data
Sep. 28, 2010   (DE) .................. 10 2010 041 508

(51) Int. Cl.
  *F03D 7/02*    (2006.01)
  *F03D 7/04*    (2006.01)

(52) U.S. Cl.
  CPC .......... *F03D 7/0276* (2013.01); *F03D 7/0296* (2013.01); *F03D 7/042* (2013.01);
  (Continued)

(58) Field of Classification Search
  CPC ...... F03D 7/0276; F03D 7/0296; F03D 7/042; F05B 2270/327; F05B 2270/334; Y02E 10/723
  See application file for complete search history.

(56) References Cited

U.S. PATENT DOCUMENTS

| 3,899,921 | A | * | 8/1975 | Hockley | ............... G01B 9/021 356/458 |
| 4,651,017 | A | * | 3/1987 | Longrigg | .............. F03D 7/0272 290/44 |
| 2009/0292397 | A1 | | 11/2009 | Egedal | |

FOREIGN PATENT DOCUMENTS

| CN | 101586527 A | 11/2009 |
| EP | 1626175 | 2/2006 |

(Continued)

*Primary Examiner* — Thomas Denion
*Assistant Examiner* — Brandon Lee
(74) *Attorney, Agent, or Firm* — Rankin, Hill & Clark LLP

(57) ABSTRACT

A method for operating a wind turbine (10). The wind turbine (10) is operated with variable rotational speed between predeterminable minimum and maximum rotational speeds. A characteristic variable (51) of an oscillation of the wind turbine (10) is detected. The wind turbine (10) includes a tower (14) and a rotor (13). An open-loop or closed-loop control device (36, 50) provides open-loop control or closed-loop control of the rotational speed of the rotor (13) between a minimum rotational speed and a maximum rotational speed during a power-supplying operation of the wind turbine. A sensor (40) detects a characteristic variable (51) of an oscillation of the wind turbine (10) and the minimum rotational speed is changed depending on the characteristic value (51) of the oscillation. The minimum rotational speed is altered depending on the characteristic variable (51) of the oscillation by the open-loop or closed-loop control device (36, 50).

14 Claims, 3 Drawing Sheets

(52) U.S. Cl.
CPC ... *F05B 2270/327* (2013.01); *F05B 2270/334* (2013.01); *Y02E 10/723* (2013.01)

(56) References Cited

FOREIGN PATENT DOCUMENTS

| | | |
|---|---|---|
| EP | 1816347 | 8/2007 |
| EP | 2085611 | 8/2009 |
| WO | 01/77524 | 10/2001 |

* cited by examiner

METHOD FOR ADJUSTING THE ROTATIONAL SPEED OF A WIND TURBINE AND WIND TURBINE

BACKGROUND OF THE INVENTION

Field of the Invention

The invention relates to a method for operating a wind turbine that supplies power. The wind turbine is operated with variable rotational speed between a predeterminable minimum rotational speed and a predeterminable maximum rotational speed, wherein a characteristic variable of an oscillation of the wind turbine or of a part of the wind turbine is detected. The invention further relates to a wind turbine having a tower and a rotor. Further, a generator with variable rotational speed is provided and an open-loop or closed-loop control device provides open-loop control or closed-loop control of the rotational speed of the rotor between a minimum rotational speed and a maximum rotational speed during a power-supplying operation of the wind turbine. A sensor for detecting a characteristic variable of an oscillation of the wind turbine or of a part of the wind turbine is also provided.

In the case of wind turbines operating with variable rotational speed, a rotor excitation end very often lies close to a tower natural frequency, which can lead to resonance oscillations under unfavourable boundary conditions, in the case of the lower operating rotational speed, which can also be called the minimum rotational speed. Normally, in order to avoid these resonance oscillations, the tower natural frequency is determined by measurement and the rotational speed range of the wind turbine is set such that operation is guaranteed with a sufficiently low oscillation level under all conditions. For this, the permissible minimum rotational speed is frequently determined such that the excitation end is 5% to 10% above the tower frequency. But this leads to profit cuts because the rotational speed range is restricted and the rotor can thus only be operated in a restricted wind speed range with optimal rotational speed and thus optimal degree of efficiency.

Description of Related Art

WO 01/77524 A1 discloses a tower-natural-frequency-dependent operating control of offshore wind turbines, in which the respective critical natural frequencies of the system and/or of system parts are determined. The rotational speed range of the rotor, in which an excitation of the overall system and/or individual system parts takes place in the area of the critical natural frequencies, is determined. The wind turbine is only operated below and above the critical rotational speed range with quick passage through the critical rotational speed range.

EP 1 816 347 A1 discloses a wind turbine, which is controlled such that when an oscillation occurs, components of the wind turbine are activated such that they can act against the oscillation excitation.

BRIEF SUMMARY OF THE INVENTION

The object of the present invention is to enable an improvement of the operating behaviour for wind turbines with variable speed rotation, in particular with respect to the energy yield, the oscillation behaviour and the lifespan.

This object is solved by a method for operating a wind turbine that supplies power. The wind turbine is operated with variable rotational speed between a predeterminable minimum rotational speed and a predeterminable maximum rotational speed. A characteristic variable of an oscillation of the wind turbine or of a part of the wind turbine is detected, which is further characterized in that the minimum rotational speed is changed depending on the characteristic variable of the oscillation.

The changing and in particular the raising of the minimum rotational speed, i.e. the lower rotational speed threshold depending on the measured oscillation, i.e. in particular depending on the oscillation amplitude, the frequency, the phase or generally on the oscillation level, thus efficiently prevents the oscillation from increasing further or respectively spreading further when an oscillation occurs. The characteristic variable of an oscillation is preferably an oscillation amplitude, an oscillation frequency, an oscillation phase and/or an oscillation direction. Furthermore, the characteristic size of the oscillation can preferably be an acceleration of the wind turbine or a part of the wind turbine. A part of the wind turbine can be for example the tower. When power is supplied by the wind turbine, this means according to the invention in particular that power is fed to an electrical network by the wind turbine, i.e. that the wind turbine is in production mode. In particular, this should not be understood as the wind turbine being in trundle mode. In fact, a minimum rotational speed must be reached in order to be able to supply efficient power or respectively energy.

The minimum rotational speed is preferably changed constantly when a predeterminable threshold value of the characteristic variable of the oscillation is exceeded. It is hereby achieved that the minimum rotational speed is only changed for relevant oscillations of the wind turbine. Within the framework of the invention, continuously is understood in particular as cyclical, for example the method according to the invention can be executed every 5 to 20 ms, in particular every 10 ms, during operation or respectively during the supply of power by the wind turbine.

The minimum rotational speed during the occurrence of a correspondingly large oscillation, i.e. an oscillation where the characteristic variable of the oscillation exceeds a predeterminable threshold value, preferably increases. The minimum rotational speed can then be reduced again when the oscillation subsides. Preferably, an increase or respectively rising of the minimum rotational speed hereby occurs with a greater increase than a reduction in the minimum rotational speed. The amount of the increase is hereby understood in particular. An oscillation with a shorter reaction time than the reduction in the minimum rotational speed during the reduction of the oscillation level or respectively of the oscillation is thus counteracted by a fast increase in the minimum rotational speed. The minimum rotational speed is preferably regulated or controlled by specification or presetting of a generator torque or a generator power. The minimum rotational speed is thus maintained by specification or presetting of the generator torque or the generator power.

The oscillation is preferably restricted after detection in particular for the processing of the characteristic variable of the oscillation. The restriction serves to avoid an oversaturation during the processing of the measured signal. The characteristic variable of the oscillation is preferably entered into a characteristic curve, wherein the output of the characteristic curve is a rotational speed difference. In particular, the amplitude of the oscillation and/or the acceleration of the wind turbine or a part of the wind turbine are preferably used as the input of a characteristic curve module, wherein the output of the characteristic curve module is precisely the rotational speed difference. The rotational speed difference is then also preferably delayed via a timing element, for example a PT1 element. This signal is then added up with the minimum rotational speed and, if applicable, the current minimum rotational speed, in order to serve as an input for the system regulator or respectively the operating control. The method according to the invention can also be executed in the system regulator or respectively the system open-loop or closed-loop control device or respectively of the operating control.

The maintenance of a minimum rotational speed can be controlled or regulated in the partial load area by setting the generator torque. If the rotational speed is too low, the generator torque is lowered by the open-loop or closed-loop control device so that the rotor rotational speed increases. The reduction of the generator torque takes place via a controller or respectively regulation of a converter, which sets the electrical parameters of the generator via a method generally known in the prior art. However, for this, more detailed explanations are performed within the framework of the figure description.

The object is further solved through a wind turbine having a tower and a rotor, wherein a generator operable with variable rotational speed is provided, wherein an open-loop or closed-loop control device is provided, which is designed for the open-loop control or closed-loop control of the rotational speed of the rotor between a minimum rotational speed and a maximum rotational speed during a power-supplying operation of the wind turbine. A sensor for detecting a characteristic variable of an oscillation of the wind turbine or of a part of the wind turbine is also provided, which is further characterized in that the minimum rotational speed is alterable or is altered depending on the characteristic variable of the oscillation.

Preferably, the characteristic variable is or will be changed by the open-loop or closed-loop control device or respectively this variable is changeable by the open-loop or closed-loop control device. The open-loop or closed-loop control device then contains or respectively comprises for example a computer program product or respectively an algorithm, by means of which the method according to the invention can be executed. The method according to the invention can actually also be integrated in an operating control of the wind turbine.

The sensor is preferably an acceleration sensor or a strain gauge. The acceleration sensor or the strain gauge strip can be arranged in the upper area of the tower or on a nacelle of the wind turbine, in a middle area of the tower and/or in the foot area of the tower in order to detect different oscillations or respectively different oscillation modi of the wind turbine or respectively of parts of the wind turbine.

Preferably, the open-loop or closed-loop control device comprises a ramp, which has a greater increase in the case of the increase of the minimum rotational speed than in the case of the decrease of the minimum rotational speed. The maintenance of the minimum rotational speed is preferably controlled or regulated by determination or presetting of a generator torque or a generator power. If the open-loop or closed-loop control device preferably has a limiter for the detected characteristic variable of the oscillation, an oversaturation of the open-loop or closed-loop control device is avoided. The open-loop or closed-loop control device also preferably comprises a characteristic curve module, which comprises a characteristic curve, in which the measured characteristic variable or respectively a processed characteristic variable such as an acceleration is provided as input variable and a rotational speed difference or respectively a rotational speed offset as output variable. The open-loop or closed-loop control device preferably has a delay element. The delay element can be for example a low pass or respectively a timing element. A PT1 element can hereby be used for example as a low pass.

BRIEF DESCRIPTION OF THE DRAWINGS

The invention is described below, without restricting the general intent of the invention, based on exemplary embodiments in reference to the drawings, wherein we expressly refer to the drawings with regard to the disclosure of all details according to the invention that are not explained in greater detail in the text. In the figures.

In the following figures, the same or similar types of elements or respectively corresponding parts are provided with the same reference numbers in order to prevent the item from needing to be reintroduced.

DETAILED DESCRIPTION OF THE INVENTION

Figure 1:
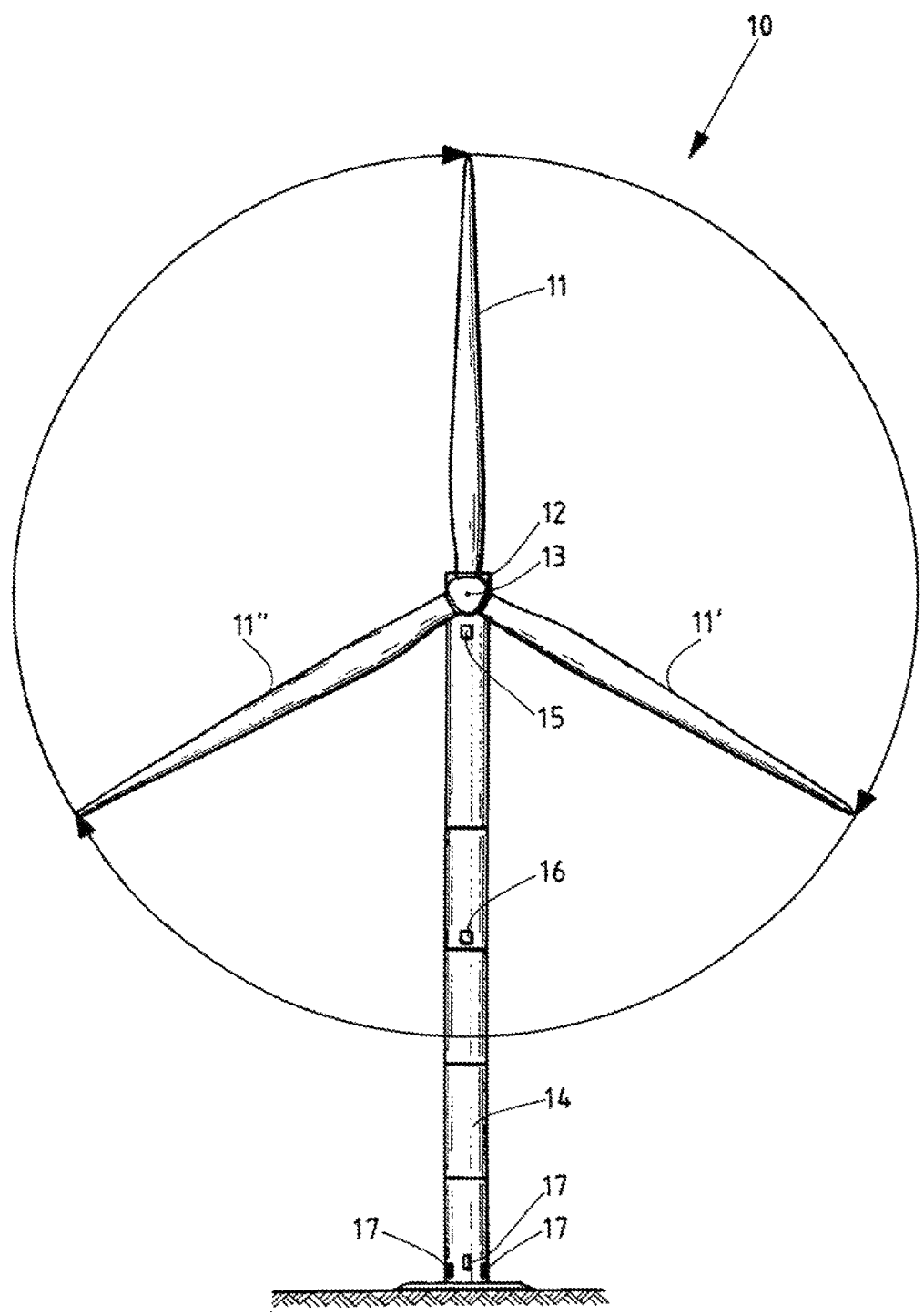
FIG. 1 is an elevation view of a wind turbine.

FIG. 1 shows schematically a wind turbine 10 with a rotor 13, which comprises three rotor blades 11, 11' and 11", which are designed circumferentially in the direction of the arrow. The rotor 13 sits on a nacelle 12 above a tower 14. Sensors 15, 16 and 17 are provided, which can detect an oscillation or respectively an oscillation level of the tower or respectively of the wind turbine. These can hereby be acceleration sensors for example but also strain gauges. Strain gauges are preferably arranged in the area of the tower foot at sensor 17 and acceleration sensors in the middle at 16 and in the upper area of the tower 14 at 15. Several sensors can also be used sensibly at the respective height, for example three, four or more sensors, which can detect oscillations in different directions.

For example, a tower oscillation, which is in the direction of the present rotor axis direction, i.e. in and out of the plane of projection in FIG. 1, can be detected by means of one sensor or several sensors. An oscillation excitation hereby takes place for example at a low rotor rotational speed when the so-called "3p frequency," i.e. the blade pass-through frequency, is close to the first tower bending natural frequency. The invention can also be sensibly used when the rotor rotational frequency (the so-called "1p frequency") is too close to a tower natural frequency. Since in this case the excitation often originates from an inertia or aerodynamic imbalance, the tower oscillation in this example is preferably detected in a direction perpendicular to the present rotor axis direction, i.e. in FIG. 1 in the plane of projection. This is then a detection of the lateral oscillation.

In the case of a second tower bending natural frequency, it makes sense to arrange the sensor in the middle of the tower 14 in position 16. As mentioned, strain gauges can also be used in the tower foot to detect oscillations in the first or in a higher natural frequency. At least two or four sensors are preferably distributed over the circumference of the tower in order to be able to detect, depending on the wind direction, the oscillation in direction of the rotor axis or in the case of the alternative design perpendicular to it.

Figure 2:
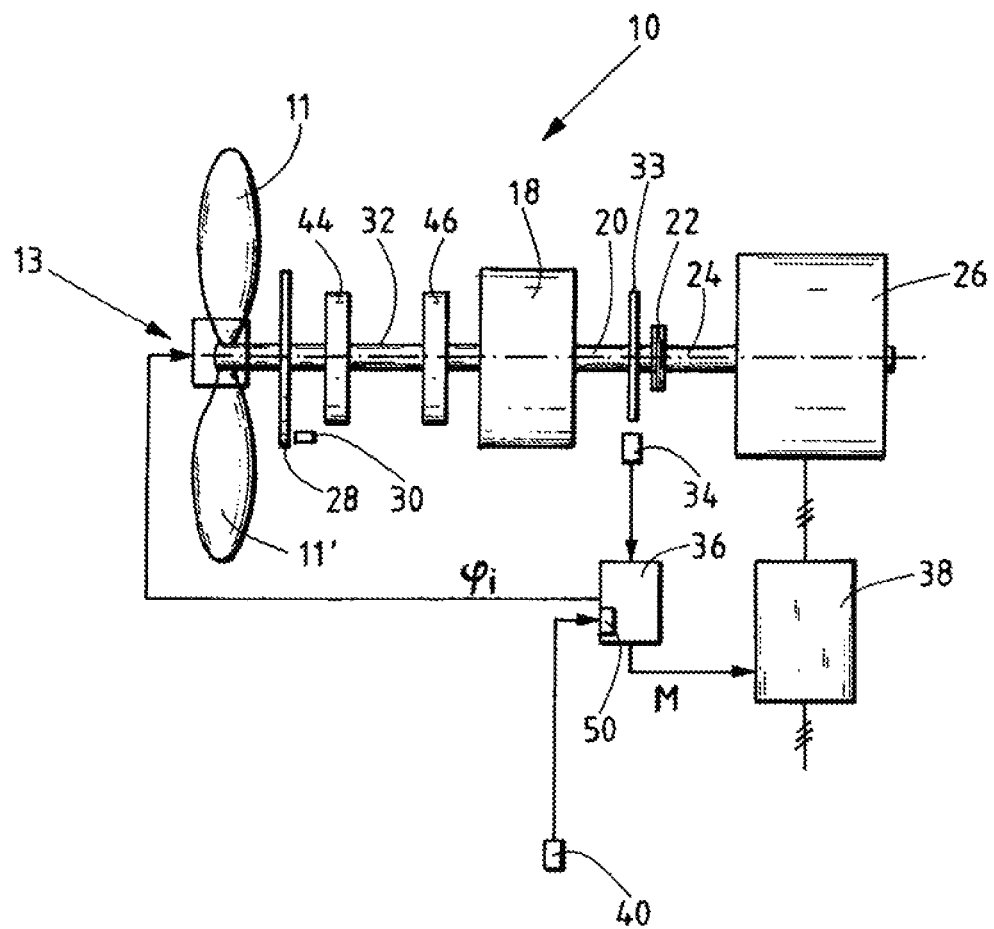
FIG. 2 is an elevation view of a wind turbine according to the invention.

FIG. 2 shows schematically a wind turbine 10 according to the invention with corresponding components or respectively parts of the wind turbine. A rotor blade 11 and a rotor blade 11' of the rotor 13 are shown. In the event that the rotor moves, the shaft 32 also moves in the bearings 44 and 46, then also accordingly the locking disk 28, in the vicinity of which a sensor 30 is arranged, in order to determine the rotational speed of the slow shaft 32. Via a gear 18, an output shaft 20 is connected with a fast shaft 24 via a coupling 22, wherein the shaft 24 drives the rotor of the alternator 26. A transmitter disk 33, in the vicinity of which a rotational speed sensor 34 is also arranged, is arranged on the output shaft 20.

The measured rotational speed of the rotational speed sensor 34 is incorporated into the open-loop or closed-loop control device 36, by means of which for example a default angle $\phi i$ is generated for the rotor blades 11 and 11' for the setting of the rotor blade angle or respectively pitch angle. The rotational speed determined via the sensor 30 can be fed alternatively or additionally to the open-loop or closed-loop control device.

A torque M is also specified by the open-loop or closed-loop control device, which is fed to a converter 38. This open-loop or closed-loop control device 36 sends a torque control signal M to a converter 38 for the alternating current created by the generator 26. The converter creates alternating current with corresponding determinable parameters for the purpose of the feeding to a network. With the help of a load-optimized regulation of the converter 38, it is possible to realize an electronic oscillation damping for the drive train. An exact detection of the rotational speed at the drive train is also required for this.

The open-loop or closed-loop control device comprises an adjustment module 50 via which the minimum rotational speed of the rotor or respectively of the shaft 20 or respectively of the shaft 24 can be adjusted. The adjustment module 50 can also be provided separately from the open-loop or closed-loop control device. Within the frame of the invention, the formulation includes that the minimum rotational speed is alterable or is altered depending on the characteristic variable of the oscillation by the open-loop or closed-loop device, that this can also occur through an adjustment module, which can be a component of the open-loop or closed-loop control device and is thus integral with the open-loop or closed-loop control device. This can also occur through a corresponding adjustment module, which is not provided integrally with the open-loop or closed-loop control device and is thus separated spatially from the actual open-loop or closed-loop control device. Within the framework of the invention, the open-loop or closed-loop control device also then comprises this adjustment module arranged separately from the open-loop or closed-loop control device.

A characteristic variable of an oscillation of the wind turbine or a part of a wind turbine is measured by a sensor 40, which can be for example an acceleration sensor, which is labelled with 15, 16 or 17 in FIG. 1. The sensor is connected with the adjustment module 50 or respectively the open-loop or closed-loop control device 36. The signal then serves, as explained in great detail in connection with FIG. 3, to adjust or respectively change the minimum rotational speed depending on the characteristic variable of the oscillation.

Figure 3:
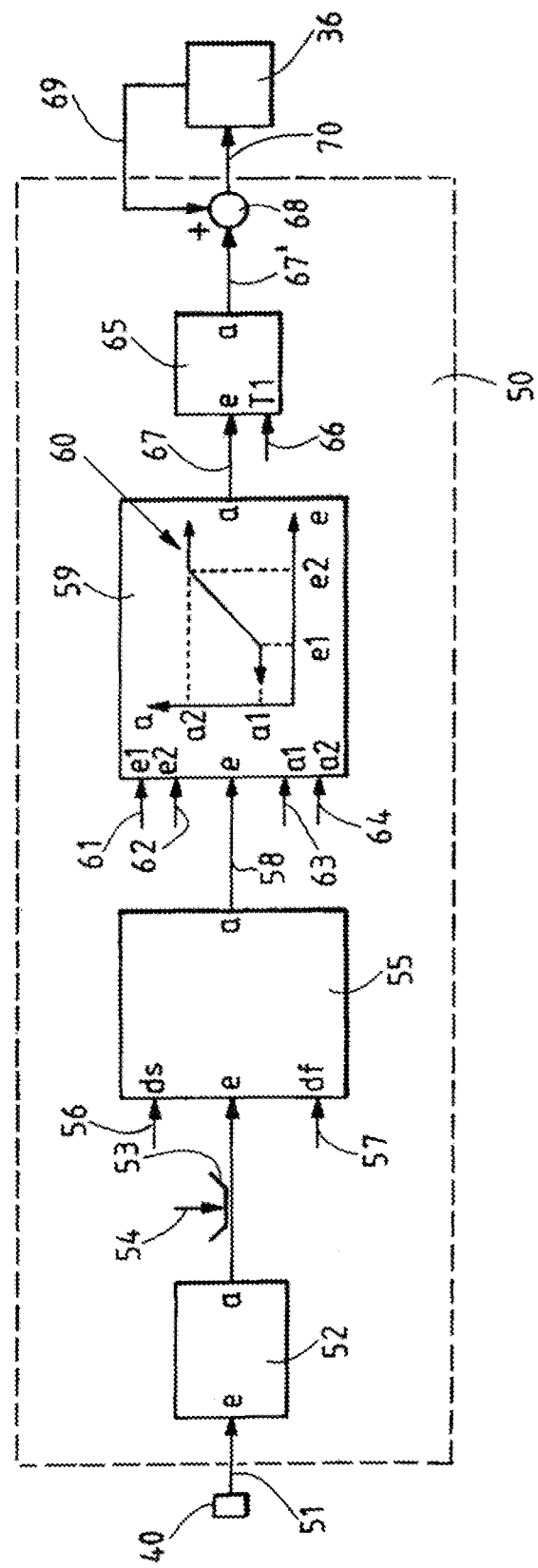
FIG. 3 is a diagram of an open-loop or closed-loop control device.

FIG. 3 shows schematically an open-loop and closed-loop control device according to the invention comprising an adjustment module 50 and an open-loop and closed-loop control device 36. An input signal, which is an acceleration signal 51, is fed through an acceleration sensor 40 at input e of the rectifier 50. The acceleration signal is rectified in the rectifier 52 so that an absolute value results. The measured tower acceleration is mainly sinusoidal so that it makes sense to obtain an absolute value for further processing.

Thus, an absolute value of an acceleration signal is thus further processed as output a. For this, the absolute value is restricted in a limiter 53, for example to a parameter of 50 mG (milligravitation acceleration). A rectified acceleration signal is then provided for the input e of the ramp module 55. For example +20 mG/s is provided as parameter for the ramp module for ds, i.e. for an increasing ramp and df −0.03 mG/s as parameter for a decreasing ramp.

The ramp module 55 can be designed such that the following condition is fulfilled: a=a+df applies to e−a<df, otherwise (a=a+ds applies to e−a>ds, otherwise a=e). This result is then given as the acceleration value 58 from output a of the ramp module 55 to the input e of the characteristic curve module 59. The characteristic curve module 59 has e1 (61), e2 (62), a1 (63) and a2 (64) as the predeterminable parameters, wherein e1 can be e.g. 25 mG and e2 e.g. 50 mG and a1 0 rpm and a2 80 rpm or 50 rpm.

The output signal a of the ramp module 59, i.e. after input signal e has been applied to the characteristic curve 60, results in a rotational speed difference 67, which is specified as rotational speed offset 67' after passing through a low pass 65. The low pass 65 can be designed as a PT1 element with P=1 with an enterable or respectively predeterminable parameter 66 of T1, i.e. for example a time of 10 s. The rotational speed offset 67' is then added to the minimum rotational speed 69 or respectively the minimum rotational speed value 69 in summer 68 and made available as updated minimum rotational speed setpoint value of the open-loop or closed-loop control device 36 or respectively further processed in an open-loop or closed-loop control device, which comprises both the open-loop or closed-loop control device 36 as well as the adjustment module 50. With this value 70, i.e. the updated minimum rotational speed setpoint value, the wind turbine with variable rotational speed is then further operated such that a minimum rotational speed is achieved at an oscillation of the wind turbine, which increases so that the excitation frequency of the oscillation is abandoned and the oscillation reduces again. Within the framework of this application, excitation frequency means in particular a frequency that is so close to a natural frequency of a part of the wind turbine that the wind turbine is excited to an undesired oscillation with the natural frequency.

It is avoided through the restriction of the measurement signal in the limiter 53 that a saturation effect takes place in the ramp module 55. The ramp module 55 quickly receives acceleration increases and slowly reduces the maximum amplitudes. Moreover, a filter effect, for example for EMC disturbances, is also hereby achieved. The slow reduction, for example with the falling ramp of −0.03 mG/s leads to a slow reduction in the rotational speed difference 67 or respectively of the rotational speed offset 67'. This basically means a static state for the system regulator and calms the system down. A safe operating procedure is provided by this asymmetrical ramp design. The system regulator thus takes optimal advantage of available wind.

The characteristic curve module 59 outputs a rotational speed offset or respectively a rotational speed difference 67 of 0 rpm in the case of accelerations under e1. In the case of accelerations above e2, a rotational speed difference 67 of for example 80 rpm is output in the case of a wind turbine with a nominal rotational speed of e.g. 1800 rpm. Between the acceleration parameters, the rotational speed difference is adjusted linearly according to the occurring acceleration in this exemplary embodiment. Other adjustments can also be made instead of the linear adjustment. In a real implementation, an adjustment of the rotational speed parameter preferably does not take place in rpm, rather in % with respect to the nominal speed, in order to thus be system-independent and network-frequency-neutral, i.e. in particular applicable to 50 Hz and 60 Hz generators with a different nominal rotational speed.

The low pass 65, which is designed as PT1 element in this exemplary embodiment, restricts an increase in the case of a spontaneous acceleration increase, i.e. a gentle setpoint value change for the open-loop or closed-loop control device or respectively for the wind turbine. The low pass filter has hardly any effect in the case of the slowly falling acceleration values. The summer 68 then adds the rotational speed offset 67' to the original setpoint value for the gear rotational speed.

Within the framework of the invention, the ramp module 55 and the characteristic curve module 59 can also be arranged in the opposite order so that the acceleration is first converted into a rotational speed signal in the characteristic curve module and the ramp function is then applied to the rotational speed level. The procedure is executed analogously to the above description, but with the opposite module order.

The solution according to the invention is characterized by a hard coupling of the acceleration with the rotational speed offset, whereby the procedure is very robust. The procedure can be used in each operating state, even at a nominal rotational speed. It has basically no effect at a nominal rotational speed. However, if the wind is highly gusty and decreases abruptly, the minimum rotational speed may at first increase under certain circumstances, which also makes sense for tower offloading from previously turbulent conditions with significant tower accelerations. The method according to the invention only raises the minimal rotational speed as much as necessary so that the system does not go down with tower oscillations. In this manner, the output curve is only slightly impacted in the lower rotational speed range. Moreover, the minimum rotational speed is only raised when the tower acceleration increases significantly. It can be determined which values are significant. In particular in the case of small towers with e.g. less than 70 m hub height, in particular at a 2 MW system, noticeably many tower oscillations took place temporarily with little wind. This can occur for example through an unfavourable upwind flow or oscillation effects with a cable loop. The method according to the invention is effective in these situations in order to dampen the 3P excitation and to avoid a shutdown. The method according to the invention can always run cyclically, i.e. continuously, and is thus not dependent on different operating states. Continuously means in particular that the method according the invention can be performed cyclically for example every 10 ms. In the case of accelerations under the parameter e1 of the ramp module 59, a rotational speed difference 67 of 0 rpm is output. This is normal operation.

Alternatively, the method can only be used in a predetermined rotational speed range, in particular only in the lower rotational speed range of the wind turbine, for example below a predetermined limit speed or below a predetermined limiting performance or of another parameter correlated with the rotational speed (e.g. wind speed). It is thus avoided that in the case of a storm in a mode with relatively high rotational speeds the minimum rotational speed is increased, since potentially occurring large accelerations are attributed not to the vicinity with respect to the tower resonance but rather to the high energy content of wind gusts in the storm. If the method is executed in this operating mode, it has the advantage that the rotor can be sufficiently strongly reduced in the rotational speed in the case of potential negative gusts in order to be able to continue to be operated in the energetic optimal point. The energy yield is thus increased.

All named characteristics, including those taken from the drawings alone, and individual characteristics, which are disclosed in combination with other characteristics, are considered alone and in combination as important to the invention. Embodiments according to the invention can be fulfilled through individual characteristics or a combination of several characteristics.

List Of References
10 Wind turbine
11, 11', 11" Rotor blade
12 Nacelle
13 Rotor
14 Tower
15 Sensor
16 Sensor
17 Sensor
18 Gear
20 Output shaft
22 Coupling
24 Shaft
26 Alternator
28 Locking disk
30 Sensor
32 Shaft
33 Transmitter disk
34 Sensor
36 Open-loop or closed-loop control device
38 Converter
40 Sensor
44 Bearing
46 Bearing
50 Adjustment module
51 Acceleration signal
52 Rectifier
53 Limiter
54 Predeterminable value
55 Ramp module
56 Parameter rising ramp
57 Parameter falling ramp
58 Acceleration value
59 Characteristic curve module
60 Characteristic curve
61-64 Parameter
65 Low pass
66 Parameter
67 Rotational speed difference
67' Rotational speed offset
68 Summer
69 Minimum rotational speed value
70 Updated minimum rotational speed setpoint value
M Generator torque
e Input variable
a Output variable

The invention claimed is:
1. A method of operating a wind turbine (10) that supplies power, comprising:
operating the wind turbine (10) with variable rotational speed between a predeterminable minimum rotational speed and a predeterminable maximum rotational speed,
detecting a characteristic variable (51) of an oscillation of the wind turbine (10),
changing the minimum rotational speed depending on the characteristic variable (51) of the oscillation, such that an increase in the minimum rotational speed takes place at a greater rate than a reduction in the minimum rotational speed, and operating the wind turbine (10) with variable rotational speed between the changed minimum rotational speed and the predeterminable maximum rotational speed.

2. The method according to claim 1, wherein the minimum rotational speed is continuously changed when a predeterminable threshold value of the characteristic variable (51) of the oscillation is exceeded.

3. The method according to claim 1, wherein the characteristic variable (51) of the oscillation is at least one of an amplitude, a direction, a frequency, a phase of the oscillation, and an acceleration of the wind turbine (10).

4. The method according to claim 1, wherein the minimum rotational speed is based upon determination or presetting of a generator torque (M) or a generator power.

5. The method according to claim 1, further comprising: restricting the characteristic variable (51) of the oscillation is restricted after the characteristic variable is detected.

6. The method according to claim 1, further comprising: inputting the characteristic variable (51) of the oscillation into a characteristic curve (60), and outputting a rotational speed difference (67) from the characteristic curve (60).

7. A wind turbine (10), comprising:
a tower (14);
a rotor (13);
a generator (26) operable with variable rotational speed;
an open-loop or closed-loop control device (36, 50) is configured to provide open-loop control or closed-loop control of a rotational speed of the rotor (13) between a minimum rotational speed and a maximum rotational speed during a power-supplying operation of the wind turbine (10); and a sensor (40) that detects a characteristic variable (51) of an oscillation of the wind turbine (10), wherein the open-loop or closed-loop control device (36, 50) is further configured to change the minimum rotational speed depending on the characteristic variable (51) of the oscillation such that an increase in the minimum rotational speed takes place at a greater rate than a reduction in the minimum rotational speed.

8. The wind turbine (10) according to claim 7, wherein the sensor (40) is an acceleration sensor.

9. The wind turbine (10) according to claim 7, wherein the open-loop or closed-loop control device (36, 50) is further configured to maintain the minimum rotational speed by determination or presetting of a generator torque (M) or a generator power.

10. The wind turbine (10) according to claim 7, wherein the open-loop or closed-loop control device (36, 50) is further configured to limit the detected characteristic variable (51) of the oscillation when changing the minimum rotational speed.

11. The wind turbine (10) according to claim 7, wherein the open-loop or closed-loop control device (36, 50) has a delay element (65).

12. The method according to claim 1, wherein the characteristic variable (51) of the oscillation includes an acceleration of the wind turbine (10).

13. The method according to claim 1, wherein the characteristic variable (51) of the oscillation includes a phase of the oscillation.

14. The wind turbine (10) according to claim 7, wherein the sensor (40) is a strain gauge.

* * * * *